US011325797B2

(12) United States Patent
Delieutraz et al.

(10) Patent No.: US 11,325,797 B2
(45) Date of Patent: May 10, 2022

(54) DEVICE FOR GAS AND/OR VACUUM DISTRIBUTION, SUCTION UNIT, FEEDER, SHEET PROCESSING MACHINE AND METHOD FOR PILOTING A DEVICE FOR GAS AND/OR VACUUM DISTRIBUTION

(71) Applicant: BOBST MEX SA, Mex (CH)

(72) Inventors: Nicolas Delieutraz, Geneva (CH); Yann Delley, Chapelle-sur-Moudon (CH)

(73) Assignee: BOBST MEX SA

( * ) Notice: Subject to any disclaimer, the term of this patent is extended or adjusted under 35 U.S.C. 154(b) by 677 days.

(21) Appl. No.: 16/080,458

(22) PCT Filed: Mar. 7, 2017

(86) PCT No.: PCT/EP2017/025039
§ 371 (c)(1),
(2) Date: Aug. 28, 2018

(87) PCT Pub. No.: WO2017/153053
PCT Pub. Date: Sep. 14, 2017

(65) Prior Publication Data
US 2019/0062084 A1    Feb. 28, 2019

(30) Foreign Application Priority Data
Mar. 7, 2016   (EP) .................................. 16020068

(51) Int. Cl.
*B65H 3/08* (2006.01)
*F16K 31/124* (2006.01)
*F16K 27/00* (2006.01)

(52) U.S. Cl.
CPC ......... *B65H 3/0891* (2013.01); *B65H 3/0816* (2013.01); *F16K 27/003* (2013.01);
(Continued)

(58) Field of Classification Search
CPC ................ B65H 3/0891; B65H 3/0816; B65H 2406/411; F16K 31/124; F16K 27/003
See application file for complete search history.

(56) References Cited

U.S. PATENT DOCUMENTS 3,999,568 A * 12/1976 Chapman .............. F16K 15/025
137/115.16
4,878,647 A    11/1989 Putt et al.
(Continued)

FOREIGN PATENT DOCUMENTS

CN         102358559 A    2/2012
DE   10 2007 052 602 A1   5/2009
(Continued)

OTHER PUBLICATIONS

International Search Report dated May 30, 2017 in corresponding PCT International Application No. PCT/EP2017/025039.
(Continued)

*Primary Examiner* — Jeremy R Severson
(74) *Attorney, Agent, or Firm* — Ostrolenk Faber LLP

(57) ABSTRACT

The invention relates to a device for gas and/or vacuum distribution (1) for a sheet processing machine (100), the device includes: at least one controllable pilot valve (4; 40), a fixed body (5) including: at least one main gas inlet (7) to be connected to a gas or vacuum source, at least one main gas outlet (8) intended to be connected to at least one suction cup and/or to at least one nozzle, at least a first and a second control gas openings (10, 11), at least one of the openings being connected to the controllable pilot valve (4; 40), at least one housing (9) having a first chamber (9a) communicating with the main gas inlet (7) and outlet (8) and a second chamber (9b) communicating with the first and second control gas openings (10, 11), at least one mobile piston (6) axially movable in the housing (9) by the action of a control gas or vacuum supplied in the second chamber (Continued)

(9b) through the at least one control gas opening (10, 11) connected to the controllable pilot valve (4; 40), the mobile piston (6) being movable between: a closed position in which the mobile piston (6) blocks a gas path (16) between the main gas inlet (7) and outlet (8) in the first chamber (9a), and an open position in which the mobile piston (6) releases the gas path (16), first and second chambers (9a, 9b) isolated from each other by cooperation of shapes between the mobile piston (6) and the housing (9) without frictional seal between the mobile piston (6) and the housing (9). Also disclosed are a suction unit and a feeder including such a device for gas and/or vacuum distribution and a sheet processing machine comprising such feeder or such a device for gas and/or vacuum distribution.

21 Claims, 4 Drawing Sheets

(52) U.S. Cl.
CPC ...... *F16K 31/124* (2013.01); *B65H 2406/411* (2013.01); *B65H 2701/1764* (2013.01)

(56) References Cited

U.S. PATENT DOCUMENTS

| | | | |
|---|---|---|---|
| 5,163,667 A | 11/1992 | Rebaud | 271/98 |
| 6,038,976 A | 3/2000 | Helmstädter et al. | |
| 7,320,322 B2 * | 1/2008 | Manhard | A61M 16/20 128/204.18 |
| 2009/0057980 A1 | 3/2009 | Gibson | 271/3.09 |
| 2009/0078899 A1 * | 3/2009 | Tissue | F16K 11/0712 251/129.15 |
| 2009/0166574 A1 | 7/2009 | Hagihara | 251/366 |

FOREIGN PATENT DOCUMENTS

| | | |
|---|---|---|
| EP | 0 453 985 A2 | 10/1991 |
| EP | 0 603 396 A1 | 6/1994 |
| EP | 2 829 379 A1 | 1/2015 |
| JP | S59-159474 A | 9/1984 |
| JP | S62-77380 U | 5/1987 |
| JP | H01-176281 U | 12/1989 |
| JP | H02-89884 A | 3/1990 |
| JP | H04-254006 A | 9/1992 |
| JP | H05-69998 A | 3/1993 |
| JP | H11-240645 A | 9/1999 |
| JP | 2001-349802 A | 12/2001 |
| JP | 2006-194298 A | 7/2006 |
| JP | 2008-057579 A | 3/2008 |
| JP | 2008-089085 A | 4/2008 |
| JP | 2011 126611 A | 6/2011 |
| JP | 2011-220422 A | 11/2011 |
| WO | WO 2004/094881 A1 | 11/2004 |

OTHER PUBLICATIONS

Written Opinion dated May 30, 2017 in corresponding PCT International Application No. PCT/EP2017/025039.

* cited by examiner

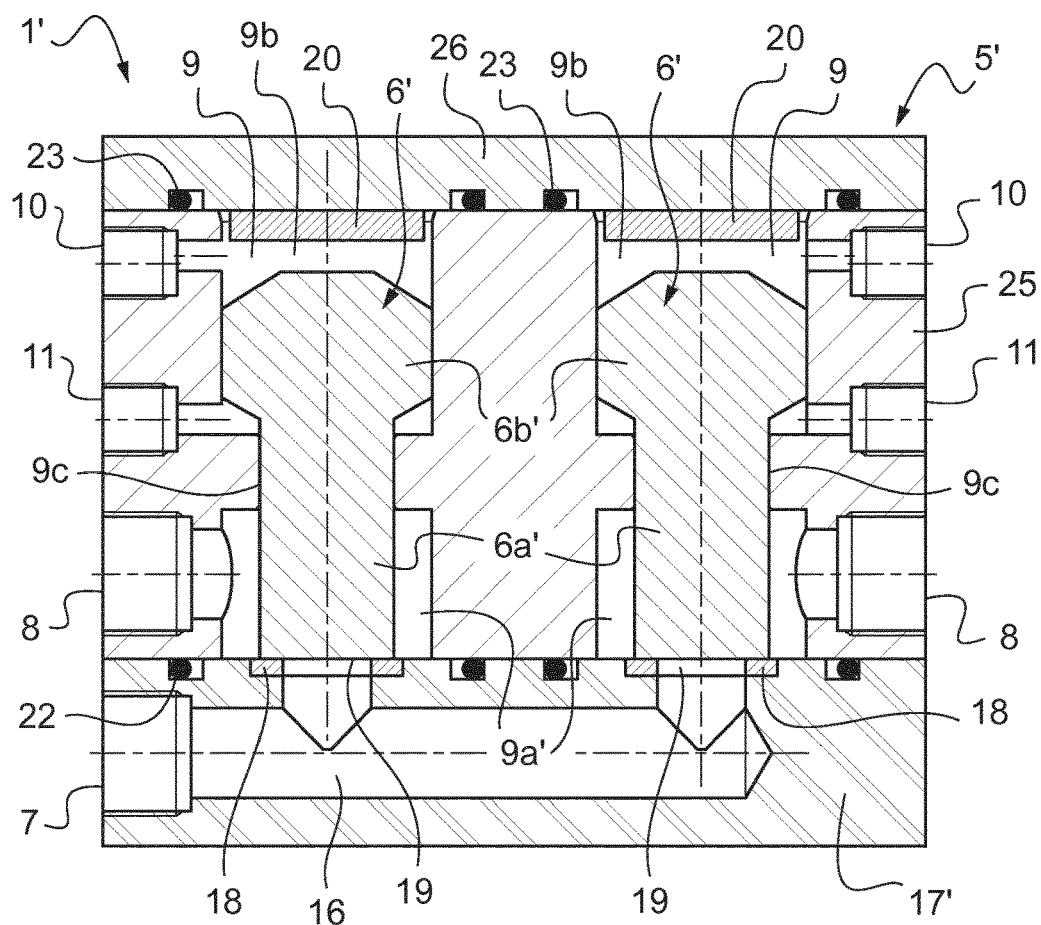
Fig.8
Fig.9
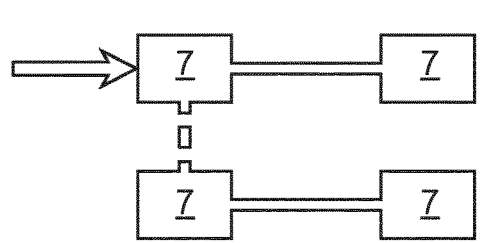
Fig.10
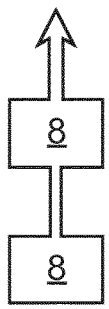 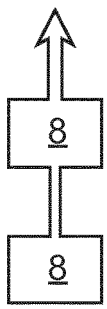
 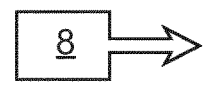

DEVICE FOR GAS AND/OR VACUUM DISTRIBUTION, SUCTION UNIT, FEEDER, SHEET PROCESSING MACHINE AND METHOD FOR PILOTING A DEVICE FOR GAS AND/OR VACUUM DISTRIBUTION

CROSS-REFERENCE TO RELATED APPLICATIONS

The present application is a 35 U.S.C. §§ 371 national phase conversion of PCT/EP2017/025039, filed Mar. 7, 2017 which claims priority of European Patent Application No. 16020068.9, filed Mar. 7, 2016, the contents of which are incorporated by reference herein. The PCT International Application was published in the English language.

The present invention relates to a device for gas and/or vacuum distribution for a sheet processing machine. The invention also relates to a suction unit and a feeder comprising such a device for gas and/or vacuum distribution. The invention further relates to a sheet processing machine comprising such feeder or such a device for gas and/or vacuum distribution and a method for piloting a device for gas and/or vacuum distribution.

Sheet processing machines allow converting of sheets, for example cardboards, into packages. This operation involves applying printed matter of decorative or informative nature onto the cardboard and also to cut it to form a package. To this end, the cardboard is severed into short sheets. These sheets are formed into easily handled stacks that can be fed, one at a time, into a sheet processing machine. Sheet processing machines usually comprise a pair of tools, such as cutting or printing rolls or platen press, operating at tremendous speed so that the sheets must be fed between tools in rapid succession to process a single sheet on each tool operation.

For that operation, a suction unit separates and transports the uppermost sheet of the stack during each working cycle of the sheet processing machine. During sheet separation, the uppermost sheet is lifted up by lifting suction cups supplied with vacuum. Then, the sheet is transported by conveying suction cups to a feed table and are placed in pincer bars at regular intervals. Vacuum and gas are alternatively provided to the suction cups during a working cycle.

Due to the high production speeds, such as 12,000 sheets per hour, piloting solenoid valves to provide alternatively vacuum and air are not acceptable as it will lead to rapid wear of the moving seals or diaphragms that have to be displaced at high frequency. The seals' lifetime could not be guaranteed for as long as the time between two maintenances processes of the sheet processing machine, due to the high gas flow rate involving high moving seal strokes, even if they can endure more than several months without any risks of failure.

To solve this problem, it is known to use rotary valves having a stator and a rotor with a rotary distribution flap switching the suction cup to atmosphere or to suction. The rotor rotation is defined in relation with the working cycle of the sheet processing machine. However, a shift is created between the angular position of the working cycle and the effective time when a vacuum is delivered in suction cups, in particular due to the time needed for the gas to move along the path between the gas or vacuum source and the suction cups. This delay might be problematic as it can limit the production speed. However, it is not possible with such mechanical systems to effectively anticipate the piloting of vacuum or gas in relation to the production speed to overcome this delay. Indeed, this delay is constant and could not vary with the production speed.

In all cases, a higher machine speed causes quicker mechanical movements of the suction cups. The current problem is that the suction cups begin to advance later or return in position earlier than necessary because the system is calculated to work both at very slow and very high speed. If it would be possible to anticipate when the gas will reach the suction cup and ensure that this occurs at a constant angle machine, time could be saved for achieving mechanical movement of the suction cups, allowing therefore lighter construction.

BACKGROUND OF THE INVENTION

One objective of the present invention is to provide sheet processing machine means for gas or vacuum distribution for suction cups and/or nozzles, which may function at high speed with a long lifetime and allow increasing production speeds.

To this end, one subject of the invention is a device for gas and/or vacuum distribution for a sheet processing machine comprising:
  at least one controllable pilot valve,
  a fixed body comprising:
    at least one main gas inlet intended to be connected to a gas or vacuum source,
    at least one main gas outlet intended to be connected to at least one suction cup and/or to at least one nozzle,
    at least a first and a second control gas openings, the least one control gas opening being connected to the controllable pilot valve,
    at least one housing comprising a first chamber communicating with the main gas inlet and outlet and a second chamber communicating with the first and second control gas openings,
  at least one mobile piston axially movable in the housing by the action of a control gas or vacuum supplied in the second chamber through the at least one control gas opening connected to the controllable pilot valve, the mobile piston being movable between:
    a closed position in which the mobile piston blocks a gas path between the main gas inlet and outlet in the first chamber, and
    an open position in which the mobile piston releases the gas path, first and second chambers being isolated from each other by cooperation of shapes between the mobile piston and the housing without frictional seal between the mobile piston and the housing.

The displacement of the mobile piston between open and closed position is performed without any moving seal or diaphragms and therefore without sealing wear. The device for gas and/or vacuum distribution can thus present a longer lifetime while used at high frequency. Indeed, the amount of gas flowing through the controllable pilot valve is very small compared to the amount of gas flowing from the main gas inlet to the main gas outlet, allowing long lifetimes as the displacement distance of the moving seal or diaphragm on each cycle is very small.

Moreover, a controllable pilot valve used to pilot the displacement of a mobile piston to block or release the passage of vacuum or gas in the suction cups or nozzles, allows a better control. The production speeds can thus be increased without the need to increase speed and acceleration of the displacements of the suction cups/nozzles. This allows increasing the production speeds with a simple structure, while limiting costs and weight of the mechanical means.

In addition, the device for gas and/or vacuum distribution is very compact and easy to connect.

According one or more features of the device for gas and/or vacuum distribution, taken alone or in combination:
- the gas path diameter size in the fixed body is between two to ten times the diameter size of the gas path through the controllable pilot valve,
- the mobile piston comprises an enlarged head which has a complementary shape to a shape of the second chamber of the housing to isolate a first and a second side of the second chamber, each control gas opening communicating with one side of the second chamber with respect to the enlarged head of the mobile piston,
- the enlarged head presents narrowed ends,
- the first and the second control gas openings are connected to a same controllable pilot valve, the controllable pilot valve being able to take:
  - a first position wherein a control gas can enter through the first control gas opening while gas can exit through the second control gas opening, and
  - a second position wherein a control gas can enter through the second control gas opening while gas can exit through the first control gas opening.
- the mobile piston comprises a cylindrical base which has a complementary shape to a cylindrical shape of the housing to isolate the first and second chambers from each other in the closed position and in the open position,
- the at least one main gas outlet and at least one first and second control gas openings open on a same first side of the fixed body, the main gas inlet opening on a second side of the fixed body, perpendicular to the first side,
- the fixed body comprises a first cover plate assembled on a side of a main portion of the fixed body to connect the first chamber to the main gas inlet,
- the device for gas and/or vacuum distribution comprises at least one sealing element fixed to the fixed body and interposed between the cover plate and an aperture of the first chamber, the sealing element abutting the mobile piston in the closed position,
- the device for gas and/or vacuum distribution comprises a plurality of housings and mobile pistons, each housing receiving one mobile piston, the cover plate connecting between them at least two main gas inlets,
- the device for gas and/or vacuum distribution comprises at least one damper fixed to the fixed body and abutting the mobile piston in the second chamber in the open position,
- the device for gas and/or vacuum distribution comprises a plurality of housings and mobile pistons, each housing receiving one mobile piston, the housings being arranged by pair, the housings of a pair being arranged one beside the other, the main gas outlet and first and second control gas openings of a housing of a pair opening on an opposite side of the main gas outlet and first and second control gas openings of the other housing of the pair, the pairs of housings being regularly spaced one behind the other,
- at least two main gas inlets communicating with a first and a second housing are connected together and at least two main gas inlets communicating with a third and a fourth housing connected together, and at least a main gas outlet communicating with the first or the second first housing and at least a main gas outlet communicating with the third or the fourth housing are connected together,
- the mobile piston is at least in part made of plastic and at least a main portion of the fixed body wherein are provided at least one housing is made of a metal.

Another object of the invention is a suction unit wherein it comprises a device for gas and/or vacuum distribution as described.

Another object of the invention is a feeder wherein it comprises a suction unit as described.

Another object of the present invention is a sheet processing machine wherein it comprises a feeder as described or a device for gas and/or vacuum distribution as described.

According to an embodiment, the sheet processing machine also comprises a central processing unit configured to pilot the at least one controllable pilot valve in relation with an angular position of a working cycle of the sheet-processing.

Another object of the invention is a method for piloting a device for gas and/or vacuum distribution as described wherein at least one controllable pilot valve is piloted at a shifted angular position during a working cycle of the sheet processing machine.

BRIEF DESCRIPTION OF THE DRAWINGS

Further advantages and features will become apparent from the description of the following figures, which are given by way of non-limiting examples:

FIG. 8 shows the device for gas and/or vacuum distribution of FIG. 7, in cross-section, FIG. 9 shows an example of an implementation of main gas inlets of the device for gas and/or vacuum distribution of FIG. 7, and FIG. 10 shows an example of an implementation of main gas outlets, with respect to the implementation of the main gas inlets of FIG. 9.

For reasons of clarity, the same elements have been given identical reference numerals. Similarly, only the elements essential to the understanding of the invention have been illustrated, in a schematic manner and without being to scale.

Figure 4:
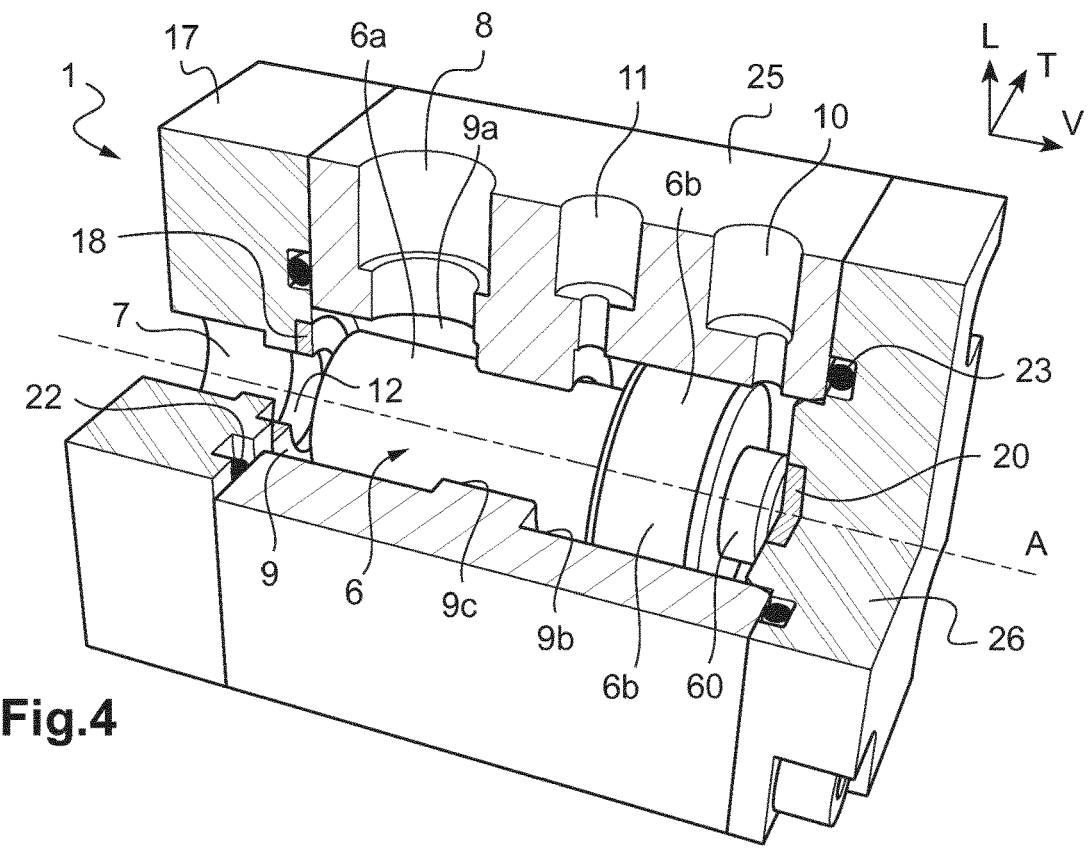
FIG. 4 shows elements of another example of a device for gas and/or vacuum distribution.

The longitudinal, vertical and transverse directions are indicated in FIG. 4 by the orthogonal spatial system (L, V, T).

DESCRIPTION OF EMBODIMENTS

Figure 1:
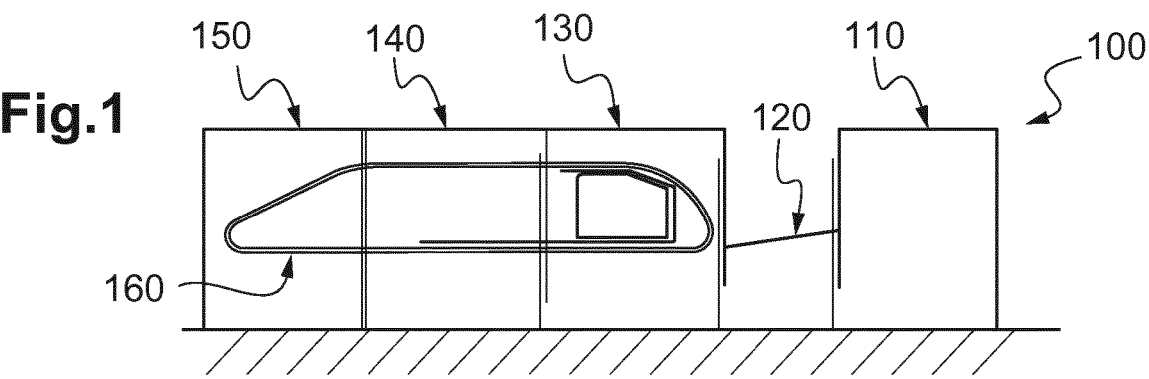
FIG. 1 is a schematic view of a sheet processing machine.

FIG. 1 illustrates a sheet processing machine 100, such as printing machine, die-cutting machine or foil stamping machine.

A sheet processing machine 100 allows transforming sheet elements into packaging, for example cardboard packaging. A stamping machine 100 conventionally comprises a plurality of workstations 110, 120, 130, 140, 150 which are juxtaposed in order to form a unitary assembly which is capable of processing a succession of flat sheet-like elements. Thus, there are provided a feeder 110 which is intended to supply the machine 100 sheet by sheet, a feeder table 120 on which the sheets are placed in layers before being positioned precisely and individually, a processing station 130 for printing, die-cutting or foil stamping, a waste ejection station 140 in the case of die-cutting machine or a supplying station of stamped foil in case of stamping machine and a reception station 150 which is intended for restacking the previously processed sheets. Transporting means 160 are further provided in order to displace individually each sheet from the output of the feed table 120 to the reception station 150, via the processing station 130. The number and nature of processing stations may vary depending on the complexity of the converting operations to be carried out on the sheet elements.

Each sheet is brought in turn to each of the workstations by the transporting means 160. A sheet is thus transferred from one workstation to the next workstation during one cycle. Each station performs its work in synchrony with this cycle that is designed in this description as the "working cycle". The movements, accelerations, speeds, forces are often represented on a curve corresponding to a working cycle, with an abscissa value varying between 0° and 360°. An abscissa value on this kind of curve is designed in this description as an "angular position".

Figure 2:
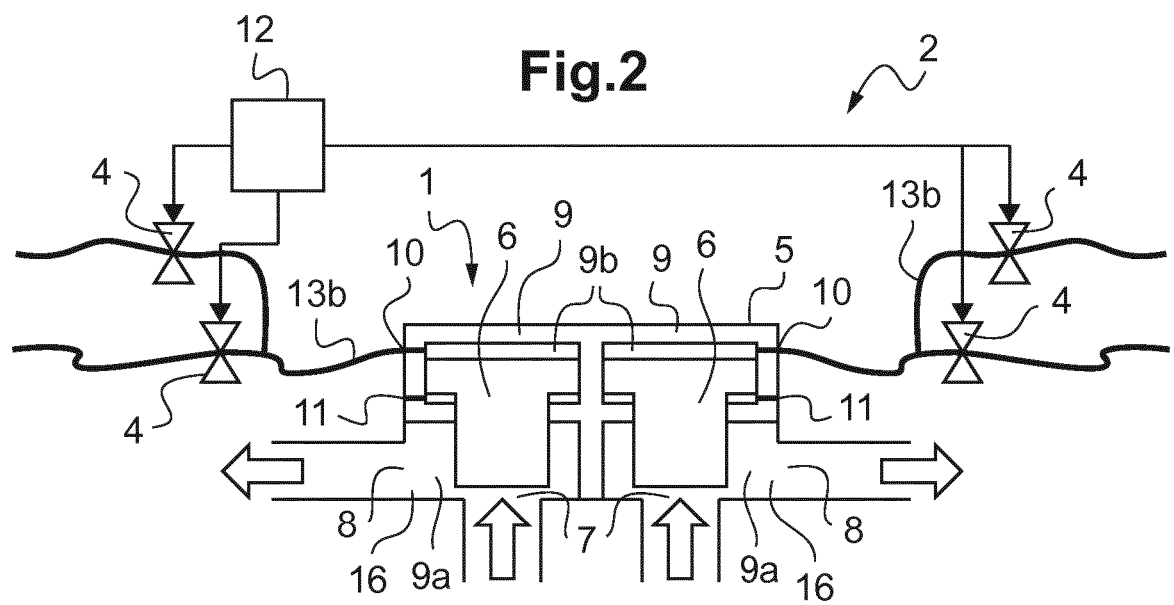
FIG. 2 represents a schematic view of a device for gas and/or vacuum distribution.

In the feeder 110, a suction unit 2 (FIG. 2) allows separation and conveying of the uppermost sheet during each working cycle of the sheet processing machine 100.

During sheet separation, the uppermost sheet is lifted up by lifting suction cups supplied with vacuum. Then, the sheet is transported by conveying suction cups. After transportation, gas can be provided to the suction cups to facilitate the release of the sheet. Gas can also be blown through nozzles, such as separator nozzles or press foot nozzles, to facilitate sheets separation.

To this end, the suction unit 2 comprises a device for gas and/or vacuum distribution 1.

The device for gas and/or vacuum distribution 1 comprises at least one controllable pilot valve 4, a fixed body 5 and at least one mobile piston 6.

The fixed body 5 comprises at least one main gas inlet 7, at least one main gas outlet 8, at least one first and second control gas openings 10, 11 and at least one housing 9.

The main gas inlet 7 is intended to be connected to a gas source or to a vacuum source. The gas source can be compressed air provided for example at a pressure of 2 bar. The vacuum source can be provided by a vacuum pump, such as air at a low pressure of 150 mbars.

The main gas outlet 8 is intended to be connected to one or more suction cups of the suction unit 2 and/or to one or more nozzles, for example via flexible ducts.

Figure 6:
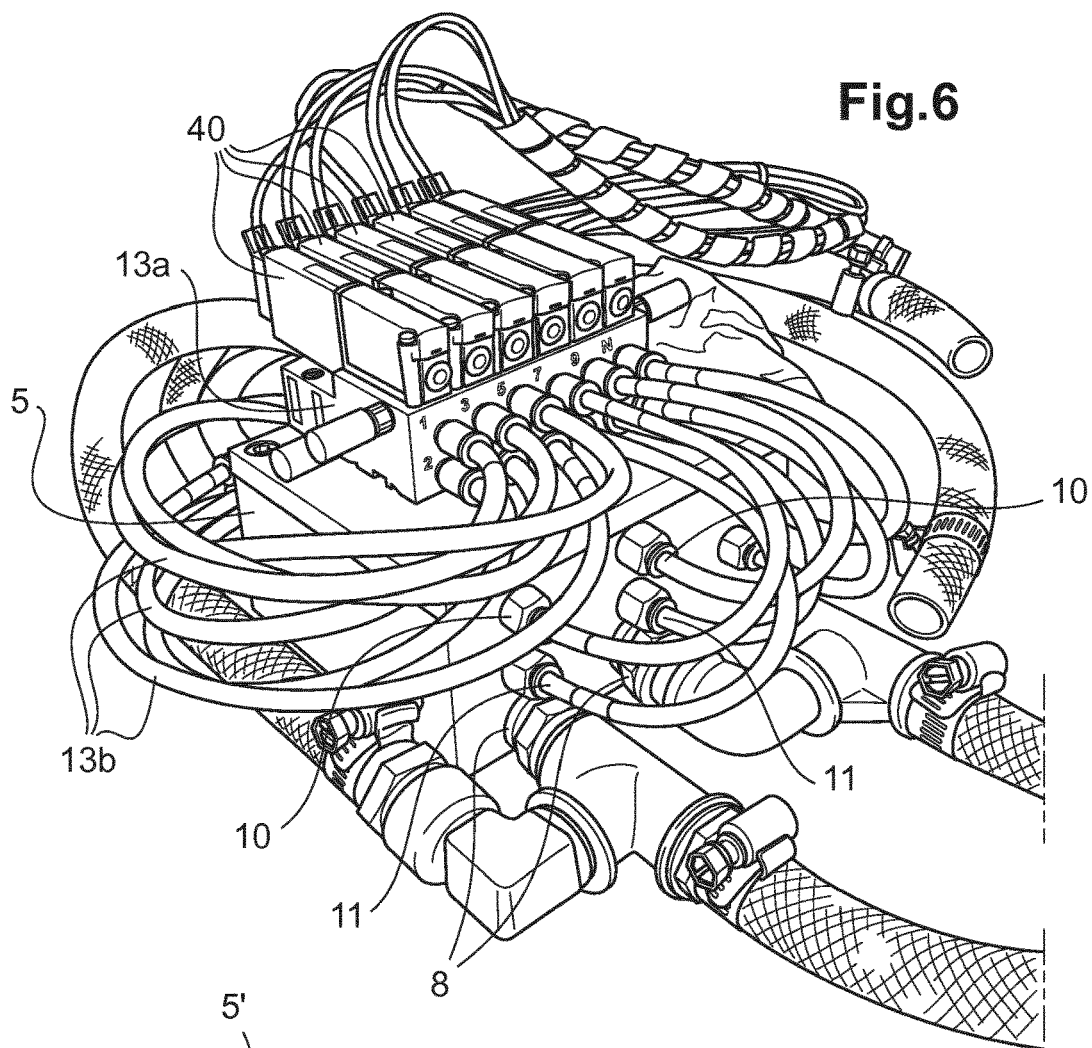
FIG. 6 shows a perspective view of elements of a device for gas and/or vacuum distribution according to another embodiment.
Figure 7:
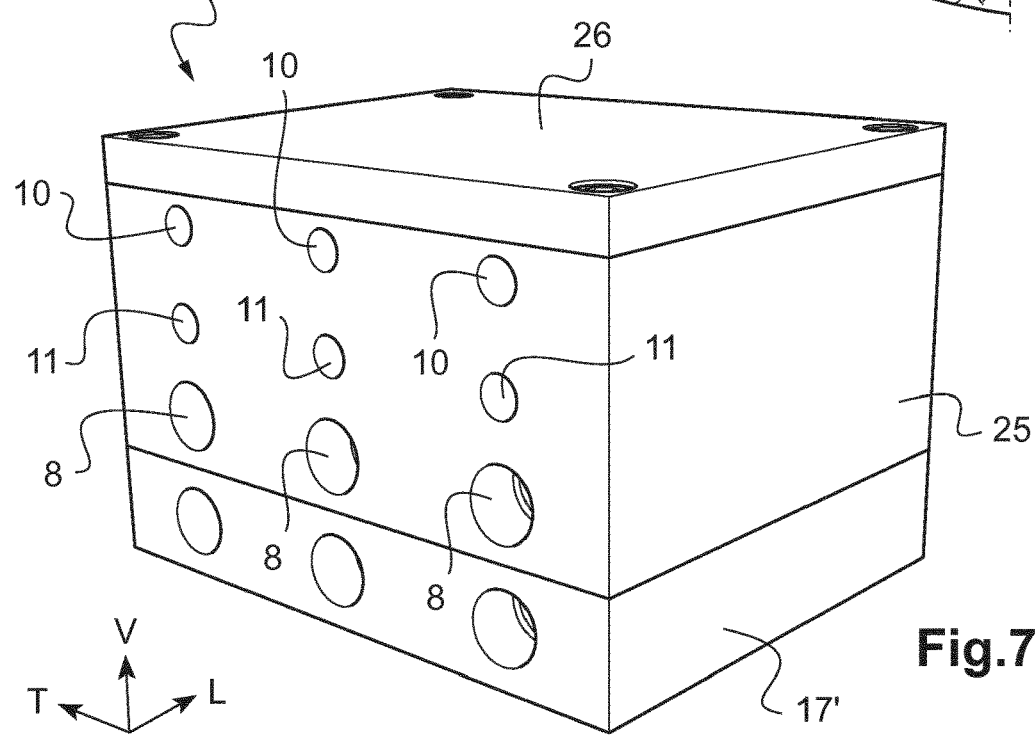
FIG. 7 shows a schematic perspective view of a fixed body of the device for gas and/or vacuum distribution of FIG. 6.

At least the first or the second control gas opening 10, 11 is connected to a controllable pilot valve 4. The connection can be done via a connection block 13a and/or flexible ducts 13b (FIG. 6) or the controllable pilot valve 4 may be directly plugged on the fixed body 5 (not represented).

The actuator of the controllable pilot valve 4 may be hydraulic, pneumatic or electric. For example, the controllable pilot valve 4 is an electromechanically operated valve as a solenoid valve.

The controllable pilot valve 4 can switch between a first and a second position. It can be controlled in position by a central processing unit 12 of the sheet processing machine 100. The central processing unit 12 may be configured to pilot the at least one controllable pilot valve 4 in relation with an angular position of a working cycle of the sheet-processing.

A pressure inlet of the controllable pilot valve 4 is connected to a control gas source or to a control vacuum source. The control gas source may be compressed air, such at a pressure of 2 or 3 bar. The control vacuum source is provided by a vacuum pump, such as air provided at a low pressure of 150 mbars.

The control gas source and the gas source can be distinct or can be the same. The control vacuum source and the vacuum source can be distinct or can be the same.

The housing 9 comprises a first chamber 9a, a second chamber 9b and a third chamber 9c. The third chamber 9c is interposed between the first and the second chambers 9a, 9b.

First, second and third chambers 9a, 9b, 9c have cylindrical shapes.

The first chamber 9a communicates with the main gas inlet 7 and the main gas outlet 8.

The second chamber 9b communicates with the first and second control gas openings 10, 11.

The mobile piston 6 is axially movable in the housing 9 along the vertical direction V by the action of a control gas or vacuum supplied in the second chamber 9b at least through the control gas opening 10 connected to the controllable pilot valve 14.

The mobile piston 6 is moveable between:
  a closed position (FIG. 5a) in which the mobile piston 6 blocks a gas path 16 between said main gas inlet 7 and outlet 8 in the first chamber 9a, and
  an open position (FIG. 5b) in which the mobile piston 6 releases the gas path 16, first and second chambers 9a, 9b being isolated from each other by cooperation of shapes between the mobile piston 6 and the housing 9 without frictional seal between the mobile piston 6 and the housing 9.

In the open position, vacuum can thus be provided to the suction cups to lift up a sheet by lifting suction cups or to transport it by conveying suction cups. Also, in the open position, gas can be provided to the suction cups to release the sheet when the sheet has reached its destination. Or, in the open position, gas can be provided to the nozzles to facilitate the separation of the sheets.

Figure 5A:
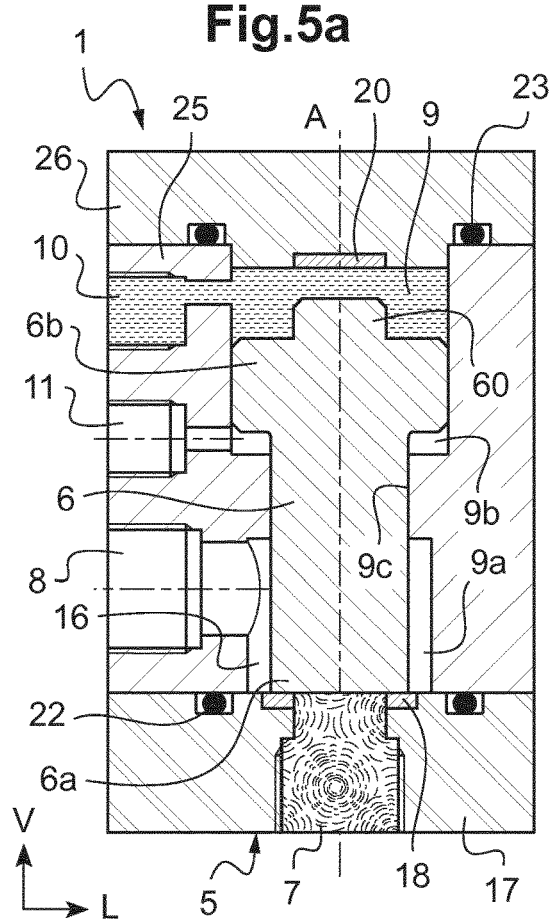
FIG. 5a shows a sectional view of the device for gas and/or vacuum distribution of FIG. 4 in the closed position.
Figure 5B:
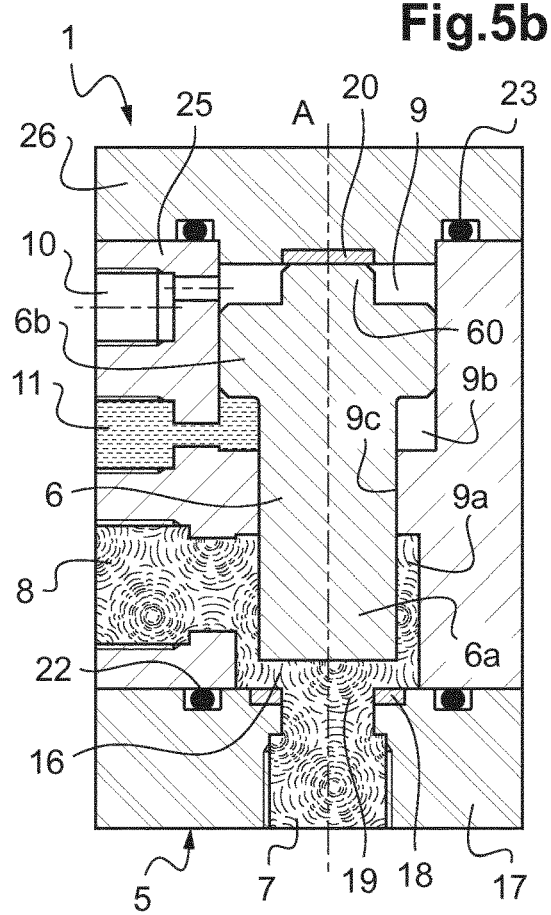
FIG. 5b shows the device for gas and/or vacuum distribution of FIG. 5a in the open position.

More visible in FIGS. 4, 5a and 5b, the mobile piston 6 is in a single piece and may comprise a cylindrical base 6a and an enlarged head 6b, the enlarged head 6b surmounting the cylindrical base 6a, the mobile piston 6 presenting a "T" shape cross-section.

The cylindrical base 6a has a complementary shape to a cylindrical shape of the third chamber 9c of the housing 9 in order to isolate the first and second chambers 9a, 9b from each other in the closed position and in the open position. The operating clearance between the cylindrical base 6a and the third chamber 9c is lower than 0.2 mm, such as comprised between 0.02 mm and 0.2 mm to ensure the sliding of the mobile piston 6 without unduly leakage flow.

Those complementary shapes allow that the sealing between the first and second chambers 9a, 9b is done without frictional seal between the mobile piston 6 and the housing 9, such as a fixed seal fixed in the fixed body 5, in frictional contact with a mobile piston 6 or such as a moveable seal mounted on the mobile piston 6, in frictional contact with the fixed body 5.

The enlarged head 6b of the mobile piston 6 may be cylindrical and expends radially. The enlarged head 6b has a complementary shape to the shape of the second chamber 9b of the housing 9 to isolate a first and a second side of the second chamber 9b. The first side communicates with the first control gas opening 10 and the second side communicates with the second control gas opening 11.

The head 6b is enlarged so as to present a sufficient radial surface allowing the control gas or vacuum to lift the mobile piston 6 or to push the head 6b downward. This head shape also ensures that gas or vacuum circulating in the gas path 16 does not involve the displacement of the mobile piston 6. Indeed, a head 6b having a higher surface involves that a higher force can be applied to displace the mobile piston 6 with a control gas at the same pressure as the circulating gas. Another way to be sure that the mobile piston 6 cannot be piloted by the circulating gas is to use a control gas at a higher pressure, such as a pressure twice the pressure of the circulating gas.

The diameter of the enlarged head 6b may be between 1.2 to 1.7 times larger than the diameter of the cylindrical base 6a. For example, the diameter of the cylindrical base 6a is in the order of 18 mm and the diameter of the enlarged head 6b is in the order of 28 mm.

Moreover, the enlarged head 6b may present narrowed ends, that is a narrowed summit and a narrowed base, allowing the control gas to enter in the second chamber 9b when the mobile piston 6 is in closed or open position. For example, as it can be seen in FIGS. 5a and 5b, the summit of the mobile piston 6 presents a disc shape protuberance 60 projecting from the enlarged head 6b. This protuberance 60 releases an annular space around the summit of the enlarged head 6b in open position. This annular space is in communication with the first control gas opening 10 to let the control gas enter and push down the enlarged head 6b. Moreover, the cylindrical base 6a is long enough to leave an annular space beneath the enlarged head 6b that communicates with the second control gas opening 11 in closed position to let the control gas enter and lift up the enlarged head 6b (FIG. 5a).

The gas path 16 diameter size in the fixed body 5 lies between two to ten times the diameter size of the gas path through the controllable pilot valve 4. For example, the gas path 16 diameter size is in the order of 12 mm and the diameter size of the gas path through the controllable pilot valve 4 is in the order of 2 mm. The gas flowrate through the gas path 16 can thus be between 4 to 100 times higher than the flowrate through the controllable pilot valve 4. For example, the flowrate through the gas path 16 is in the order of 350 l/min at 1 bar and the flowrate through the controllable pilot valve 4 is in the order of 17 l/min at 1 bar. The amount of gas flowing through the controllable pilot valve 4 is thus very small compared to the amount of gas flowing from the main gas inlet 7 to the main gas outlet 8, allowing long lifetimes as the displacement distance of the moving seal or diaphragm on each cycle is very small.

According to a first embodiment (FIG. 2), only one control gas opening 10 is connected to two controllable pilot valves 4.

Each controllable pilot valve 4 may be a two-way valve which can have a closed or open position. A first port of a first controllable pilot valve 4 is connected to a first control gas or vacuum source and a second port of the first controllable pilot valve 4 is connected to the control gas opening 10. A first port of a second controllable pilot valve 4 is connected to a second control gas or vacuum source and a second port of the second controllable pilot valve 4 is connected to the control gas opening 10.

If a vacuum is provided through the first control gas opening 10 through the first controllable pilot valve 4, it will attract by aspiration the head 6b of the mobile piston 6 in the second chamber 9b, leaving gas enter through the second control gas opening 11, blocking or releasing the gas path 16 depending on which side of the enlarged head 6b, the vacuum is supplied. If a gas is supplied through the second controllable pilot valve 4, it will push down the mobile piston 6, blocking or releasing the gas path 16 depending on which side of the enlarged head 6b, the gas is supplied.

According to another example (not shown) the first and the second control gas openings 10, 11 are connected to a respective controllable pilot valve 4. When vacuum is supplied through a first control gas opening 10, nothing or a gas is supplied into the second control gas opening 11, blocking or releasing the gas path 16 and vice-versa. Or if a gas is supplied through a first control gas opening 10, nothing or vacuum is supplied into the second control gas opening 11.

Figure 3:
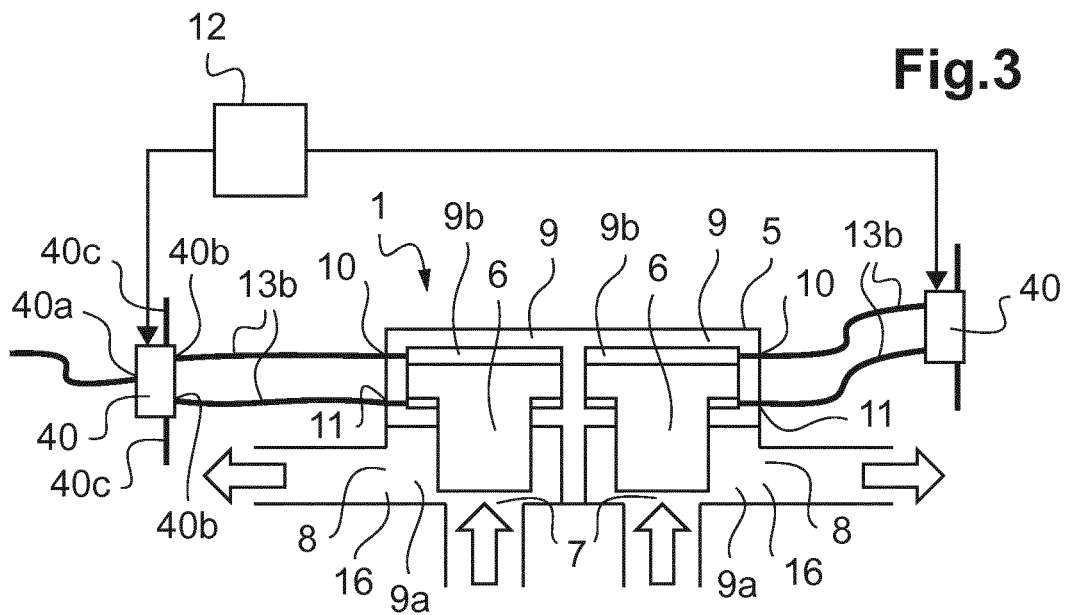
FIG. 3 represents a schematic view of another example of a device for gas and/or vacuum distribution.

According to another embodiment shown in FIG. 3, the first and the second control gas openings 10, 11 are connected to a same controllable pilot valve 40, the controllable pilot valve 40 being able to take:
  a first position wherein the control gas can enter through the first control gas opening 10 while gas already in the second chamber 9b can exit through the second control gas opening 11, and
  a second position wherein the control gas can enter through the second control gas opening 11 while gas already in the second chamber 9b can exit through the first control gas opening 10.

The controllable pilot valve 40 might be a 4-way valve or a 5-way valve (or "5/2 valve").

A 4-way valve or 5-way valve comprises four or five ports: one pressure inlet 40a connected to the control gas or vacuum source, two ports 40b providing pressure to double acting the mobile piston 6 and two outlets 40c to exhaust pressure from the second chamber 9b.

The outlets 40c exhausting pressure into atmosphere might include silencers.

FIGS. 3, 5a and 5b show an embodiment allowing improving the compactness of the device for gas and/or vacuum distribution 1.

The at least one main gas outlet 8 and at least one first and second control gas openings 10, 11 can open on a same first side of the fixed body 5. The main gas inlet 7 may open on a second side of the fixed body 5, perpendicular to the first side of the fixed body 5, such that the gas path 16 presents an "L" shape.

The fixed body 5 may comprise a first cover plate 17 assembled on a side of a main portion 25 of the fixed body 5, for example screwed, to connect the first chamber 9a to the main gas inlet 7. The main portion 25 and the first cover plate 17 have complementary parallelepiped shapes forming a compact block.

The device for gas and/or vacuum distribution 1 may also comprise at least one sealing element 18 fixed to the fixed body 5 and interposed between the cover plate 17 and an aperture 19 of the first chamber 9a. The sealing element 18 is received in an annular groove of the cover plate 17. It may be a gasket in the shape of a torus for example in elastomer. The sealing element 18 presents a diameter allowing that in the closed position, the cylindrical base 6a of the mobile piston 6 abuts against the sealing element 18 to block with good sealing the gas path 16 between the main gas inlet 7 and outlet 8.

As an alternative or complement, the end of the cylindrical base 6*a* may have a truncated form which cooperates with a truncated form of the annular groove of the cover plate 17 (not represented).

The device for gas and/or vacuum distribution 1 may also comprise a second cover plate 26 to close the main portion 25 of the fixed body 5 after manufacturing the housing 9 and may include at least one damper 20 fixed to the fixed body 5, for example on the second cover plate 26. The mobile piston 6 abuts the damper 20 in the second chamber 9*b* in the open position. The damper 20 can present a disc shape having the same diameter as the protuberance 60 of the mobile piston 6 projecting of the enlarged head 6*b*. Damper 20 may be an elastomer rubber.

The device for gas and/or vacuum distribution 1 may also comprise supplementary sealing elements 22, 23 to ensure the sealing of the device for gas and/or vacuum distribution 1, such as elastomeric torus, interposed between the main portion 25 of the fixed body 5 and the cover plate 17, around the aperture 19 and interposed between the main portion 25 and the second cover plate 26 (FIGS. 5*a*, 5*b*).

The mobile piston 6 may be at least in part made of plastic, such as of polymer, such as a polyoxymethylene (or POM) known for its very low coefficient of friction or such as polyethylene terephthalate (or PET).

The mobile piston 6 may be entirely made of plastic or may be plastic coated or may comprise a portion made of plastic or plastic coated. This portion may include at least a part of the cylindrical base 6*a* complementary to the cylindrical shape of the third chamber 9*c* of the housing 9.

At least the main portion 25 of the fixed body 5, wherein at least one housing 9 is provided, may be made of metal, such as aluminium.

A mobile piston 6 at least in part made of plastic is light, allowing it to be moved at a high cadence and it presents a very low coefficient of friction, allowing it to not use a frictional seal between the mobile piston 6 and the fixed body 5.

The device for gas and/or vacuum distribution 1 may comprise only one housing 9 receiving only one mobile piston 6, for example to provide gas in a plurality of nozzles connected to the main gas outlet 8.

In operation, assuming that the controllable pilot valve 40 is positioned in the first position and the mobile piston 6 is in the closed position (FIG. 5*a*), the central processing unit 12 can pilot the controllable pilot valve 40 in the second position in relation to an angular position in the working cycle of the sheet processing machine 100.

The control gas flows through the second control gas opening 11, displacing the mobile piston 6 in the open position while gas can exit through the first control gas opening 10 (FIG. 5*b*). The gas path 16 between the main gas inlet 7 and outlet 8 in the first chamber 9*a* is therefore cleared and gas can be provided to the nozzles.

In relation to a following angular position, the central processing unit 12 can pilot the controllable pilot valve 4 in the first position. The control gas flows through the first control gas opening 10, displacing the mobile piston 6 while gas can exit through the second control gas opening 11 (FIG. 5*a*). The gas path 16 is then blocked in the first chamber 9*a*, stopping the blowing.

The displacement of the mobile piston 6 between its open and closed positions is performed without any moving seal or diaphragms and therefore without sealing wear. The device for gas and/or vacuum distribution 1 can thus present a longer lifetime while being used at high frequency.

Moreover, a controllable pilot valve 4 used to pilot the displacement of a mobile piston 6 to block or release the passage of the vacuum or gas in the suction cups or nozzles, allows a better control.

It is possible for example to pilot at least one controllable pilot valve 4 at a shifted angular position, earlier or later than the current angular position, during a working cycle of the sheet-processing machine 100. It is therefore possible to anticipate the angular position piloting vacuum or gas in the suction cups or nozzles. This allows catching up the loss of time needed for the vacuum or gas to run through the flexible ducts to the nozzles or suction cups. The production speeds can thus be increased without the need to increase speed and acceleration of the displacements of the suction cups/nozzles. This allows increasing the production speeds with a simple structure, while limiting costs and weight of the mechanical means.

FIGS. 6, 7, 8, 9 and 10 show another embodiment wherein the device for gas and/or vacuum distribution 1' comprises at least two housings 9 and mobile pistons 6, each housing 9 receiving one mobile piston 6.

More precisely, in the illustrated example, the device for gas and/or vacuum distribution 1' comprises six housings 9 and six mobile pistons 6.

For example, two main gas outlets 8 are connected to a train of lifting suction cups, two main gas outlets 8 are connected to a train of conveying suction cups, a fifth main gas outlet 8 is connected to a train of separating nozzles and a sixth main gas outlet 8 is connected to a train of press foot nozzles (FIG. 10).

The housings 9 may be arranged in pairs, the housings 9 of a pair being arranged one beside the other. The main gas outlet 8, the first and second control gas openings 10, 11 of one housing 9 of a pair, open on an opposite side of the main gas outlet 8, the first and second control gas openings 10, 11 of the other housing 9 of the pair.

The pairs of housings 9 are regularly spaced one behind the other.

The cover plate 17' of the device for gas and/or vacuum distribution 1 may connect between them at least two main gas inlets 7, such as at least two main gas inlets 7 of a pair of a first and a second housing 9 arranged side by side (FIGS. 8 and 9). It is therefore possible to connect together the main gas inlets 7 which are connected to a same vacuum source and the main gas inlets 7 which are connected to a same gas source.

As illustrated in FIGS. 9 and 10, two main gas inlets 7 of a first and a second housing 9 are connected together to a vacuum source, two main gas inlets 7 of a third and fourth housing 9 are connected together to a gas source and two main gas inlets 7 of a fifth and sixth housing 9 are connected together to a gas source (the same or another one).

According to an embodiment, at least a main gas outlet 8 communicating with the first or the second first housing 9 and at least a main gas outlet 8 communicating with the third or the fourth housing 9 are connected together.

In the present illustrated case, the two main gas outlets 8 connected to a train of lifting suction cups are communicating with the first and third housing 9, the two main gas outlets 8 connected to a train of conveying suction cups are communicating with the second and fourth housing 9, the fifth main gas outlet 8 connected to a train of separating nozzles is communicating with the fifth housing 9 and the sixth main gas outlet 8 connected to a train of press foot nozzles is communicating to the sixth housing 9 (FIG. 10).

It is therefore possible to provide either vacuum or gas in conveying suction cups and in lifting suction cups.

The fixed body 5 may also comprise a second cover plate 26 assembled on an opposite side of the main portion 25 of the fixed body 5 to close all the second chamber 9*b* during the manufacturing of the device 1. Supplementary sealing elements 23 may thus be interposed between the main portion 25 of the fixed body 5 and the second cover plate 26. Also, dampers 20 may be fixed to the fixed body 5, on the second cover plate 26, so that abutting the enlarged head 6*b*' of the mobile piston 6' in the second chamber 9*b* in the open position.

In this second embodiment, the enlarged head 6*b*' of the mobile piston 6 presents narrowed ends made by truncated ends allowing the control gas to enter in the second chamber 9*b* in the closed and open positions.

Therefore, in operation, for example, when the two controllable pilot valves 40 of the first and second housings 9 are piloted to move the mobile piston 6 in open position and the two controllable pilot valves 40 of the third and fourth housing 9 are piloted to move the mobile piston 6 in closed position, vacuum can be provided to the lifting and conveying suction cups.

In relation to a following angular position, the central processing unit 12 can pilot the two controllable pilot valves 40 of the first and second housings 9 to move the mobile piston 6 in closed position and the two controllable pilot valves 40 of the third and fourth housing 9 to move the mobile piston 6 in open position, to provide gas in lifting and conveying suction cups.

The invention claimed is:

1. A device for gas and/or vacuum distribution for a sheet processing machine comprising:
   at least one controllable pilot valve,
   a fixed body comprising:
   at least one main gas inlet configured to be connected to a gas or vacuum source,
   at least one main gas outlet configured to be connected to at least one suction cup and/or to at least one nozzle,
   at least a first and a second control gas openings, at least one of the control gas openings connected to the controllable pilot valve,
   at least one housing comprising a first chamber communicating with the main gas inlet and outlet, and a second chamber communicating with the first and second control gas openings,
   at least one mobile piston axially movable in the housing by the action of a control gas or vacuum supplied in the second chamber through the at least one control gas opening connected to the controllable pilot valve, the mobile piston being movable between:
   a closed position in which the mobile piston blocks a gas path between the main gas inlet and the outlet in the first chamber,
   an open position in which the mobile piston releases the gas path, first and second chambers isolated from each other by cooperation of shapes between the mobile piston and the housing without frictional seal between the mobile piston and the housing,
   wherein the mobile piston comprises an enlarged head that has a complementary shape to a shape of the second chamber of the housing to isolate a first and a second side of the second chamber, each control gas opening communicating with one side of the second chamber with respect to the enlarged head of the mobile piston,
   wherein the enlarged head presents narrowed ends.

2. A device for gas and/or vacuum distribution according to claim 1, wherein the gas path has a diameter size in the fixed body that is between two to ten times a diameter size of the gas path through the controllable pilot valve.

3. A device for gas and/or vacuum distribution according to claim 2, wherein the at least one main gas outlet and at least one first and second control gas openings open on a same first side of the fixed body, the main gas inlet opening on a second side of the fixed body, perpendicular to the first side.

4. A device for gas and/or vacuum distribution according to claim 2, wherein the fixed body comprises a first cover plate assembled on a side of a main portion of the fixed body to connect the first chamber to the main gas inlet.

5. A device for gas and/or vacuum distribution according to claim 4, further comprising at least one sealing element fixed to the fixed body and interposed between the first cover plate and an aperture of the first chamber, the sealing element abutting the mobile piston in the closed position.

6. A device for gas and/or vacuum distribution according to claim 4, further comprising a plurality of housings and mobile pistons, each housing receiving a respective one of the mobile piston, the first cover plate connecting between at least two of the main gas inlets.

7. A device for gas and/or vacuum distribution according to claim 1, wherein the first and the second control gas openings are connected to a same controllable pilot valve, and the controllable pilot valve is configured to take:
   a first position wherein a control gas can enter through the first control gas opening while gas can exit through the second control gas opening, and
   a second position wherein a control gas can enter through the second control gas opening while gas can exit through the first control gas opening.

8. A device for gas and/or vacuum distribution according to claim 1, wherein the mobile piston comprises a cylindrical base which has a complementary shape to a cylindrical shape of the housing to isolate the first and second chambers from each other in the closed position and in the open position.

9. A device for gas and/or vacuum distribution according to claim 1, further comprising at least one damper fixed to the fixed body and abutting the mobile piston in the second chamber in the open position.

10. A device for gas and/or vacuum distribution according to claim 1, further comprising:
    a plurality of the housings and of the mobile pistons, each housing receiving one mobile piston;
    wherein the housings are arranged by pair, the housings of a pair being arranged one beside the other,
    wherein the main gas outlet and first and second control gas openings of a housing of a pair opening are on an opposite side of the main gas outlet and first and second control gas openings of the other housing of the pair, the pairs of housings being regularly spaced one behind the other.

11. A device for gas and/or vacuum distribution according to claim 1, further comprising:
    at least two of the main gas inlets communicating with a first and a second housing and are connected together and at least two main gas inlets communicating with a third and a fourth housing are connected together, and
    at least a main gas outlet communicating with the first or the second first housing and at least a main gas outlet communicating with the third or the fourth housing are connected together.

12. A device for gas and/or vacuum distribution according to claim 1, wherein the mobile piston is at least in part made of plastic and at least a main portion of the fixed body wherein are provided at least one housing is made of a metal.

13. A suction unit comprising a device for gas and/or vacuum distribution according to claim 1.

14. A feeder comprising a suction unit according to claim 1.

15. A sheet processing machine further comprising a feeder according to claim 14.

16. A sheet processing machine according to claim 15, further comprising a central processing unit configured to pilot the at least one controllable pilot valve in relation with an angular position of a working cycle of the sheet-processing.

17. A sheet processing machine according to claim 15, further comprising a feeder.

18. A sheet processing machine according to claim 15, further comprising a device for gas and/or vacuum distribution.

19. A method for piloting a device for gas and/or vacuum distribution according to claim 1, wherein at least one controllable pilot valve is piloted at an angular position shifted from a current angular position during a working cycle of the sheet processing machine.

20. A device for gas and/or vacuum distribution for a sheet processing machine, the device comprising:
at least one controllable pilot valve,
a fixed body comprising:
at least one main gas inlet configured to be connected to a gas or vacuum source,
at least one main gas outlet configured to be connected to at least one suction cup and/or to at least one nozzle,
at least a first and a second control gas openings, at least one of the control gas openings connected to the controllable pilot valve,
a plurality of housings, each housing comprising a first chamber communicating with the main gas inlet and outlet, and a second chamber communicating with the first and second control gas openings,
a plurality of mobile pistons, each mobile piston axially movable in the housing by action of a control gas or vacuum supplied in the second chamber through the at least one control gas opening connected to the controllable pilot valve, each mobile piston being movable between:
a closed position in which the mobile piston blocks a gas path between the main gas inlet and the outlet in the first chamber,
an open position in which the mobile piston releases the gas path, first and second chambers isolated from each other by cooperation of shapes between the mobile piston and the housing without frictional seal between the mobile piston and the respective housing,
wherein each housing is configured to receive one mobile piston, the housings being arranged by pair,
wherein the housings of a pair are arranged one beside the other, the main gas outlet and first and second control gas openings of a housing of a pair openings on an opposite side of the main gas outlet and first and second control gas openings of the other housing of the pair, the pairs of housings being regularly spaced one behind the other.

21. A device for gas and/or vacuum distribution for a sheet processing machine, the device comprising:
at least one controllable pilot valve,
a fixed body comprising:
at least one main gas inlet configured to be connected to a gas or vacuum source,
at least one main gas outlet configured to be connected to at least one suction cup and/or to at least one nozzle,
at least a first and a second control gas openings, at least one of the control gas openings connected to the controllable pilot valve,
at least one housing comprising a first chamber communicating with the main gas inlet and outlet, and a second chamber communicating with the first and second control gas openings,
at least one mobile piston axially movable in the housing by action of a control gas or vacuum supplied in the second chamber through the at least one control gas opening connected to the controllable pilot valve, the mobile piston being movable between:
a closed position in which the mobile piston blocks a gas path between the main gas inlet and the outlet in the first chamber,
an open position in which the mobile piston releases the gas path, first and second chambers isolated from each other by cooperation of shapes between the mobile piston and the housing without frictional seal between the mobile piston and the housing;
wherein at least two of the main gas inlets communicate with a first and a second housing and are connected together, and at least two main gas inlets communicate with a third and a fourth housing and are connected together, and
at least a main gas outlet communicates with the first or the second first housing, and at least a main gas outlet communicates with the third or the fourth housing and are connected together.

* * * * *